(12) United States Patent
Abraham et al.

(10) Patent No.: US 6,980,533 B1
(45) Date of Patent: Dec. 27, 2005

(54) LOAD BALANCING TECHNIQUE FOR A WIRELESS INTERNET ACCESS SYSTEM

(75) Inventors: Santosh P Abraham, Keasbey, NJ (US); Mooi Choo Chuah, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 790 days.

(21) Appl. No.: 09/650,058

(22) Filed: Aug. 29, 2000

Related U.S. Application Data (60) Provisional application No. 60/198,389, filed on Apr. 19, 2000.

(51) Int. Cl.[7] .................. H04Q 7/00; H04B 7/212; H04J 3/16; H04J 3/22
(52) U.S. Cl. .................. 370/329; 370/337; 370/347; 370/468
(58) Field of Search .................. 711/120, 202; 709/232, 105, 217, 219; 395/650; 370/60, 370/95.1, 322, 329, 337, 347, 468; 725/126

(56) References Cited

U.S. PATENT DOCUMENTS

| | | | | |
|---|---|---|---|---|
| 4,621,359 A * | 11/1986 | McMillen | .................. | 370/235 |
| 5,239,649 A * | 8/1993 | McBride et al. | .................. | 718/105 |
| 5,283,897 A * | 2/1994 | Georgiadis et al. | .................. | 709/105 |
| 5,430,731 A * | 7/1995 | Umemoto et al. | .................. | 370/337 |
| 5,499,243 A * | 3/1996 | Hall | .................. | 370/346 |
| 5,541,924 A * | 7/1996 | Tran et al. | .................. | 370/347 |
| 5,657,323 A * | 8/1997 | Jan et al. | .................. | 370/252 |
| 5,805,633 A * | 9/1998 | Uddenfeldt | .................. | 375/133 |
| 5,860,137 A * | 1/1999 | Raz et al. | .................. | 711/202 |
| 5,920,571 A * | 7/1999 | Houck et al. | .................. | 370/458 |
| 6,148,324 A * | 11/2000 | Ransom et al. | .................. | 709/105 |
| 6,307,863 B1 * | 10/2001 | Moulsley | .................. | 370/442 |
| 6,370,117 B1 * | 4/2002 | Koraitim et al. | .................. | 370/232 |
| 6,389,474 B1 * | 5/2002 | Chien et al. | .................. | 709/232 |
| 6,412,073 B1 * | 6/2002 | Rangan | .................. | 713/202 |
| 6,438,652 B1 * | 8/2002 | Jordan et al. | .................. | 711/120 |
| 6,560,633 B1 * | 5/2003 | Roberts et al. | .................. | 709/202 |
| 6,577,610 B1 * | 6/2003 | Kronz | .................. | 370/322 |
| 6,598,232 B1 * | 7/2003 | McAlear | .................. | 725/126 |
| 6,608,827 B1 * | 8/2003 | Austin | .................. | 370/348 |
| 6,658,010 B1 * | 12/2003 | Enns et al. | .................. | 370/401 |
| 6,891,847 B1 * | 5/2005 | Gubbi | .................. | 370/442 |
| 2002/0026560 A1 * | 2/2002 | Jordan et al. | .................. | 711/120 |

OTHER PUBLICATIONS

"A Model for Teletraffic Performance and Channel Holding Time □□Characterization in Wireless Cellular Communication with General Session and Dwell □□ Time Distributions". Phillip V. Orlik and Stephen S. Rappaport, Fellow, IEEE. 1998.*

Operating System Principles 1973. Per Brinch Hansen, p214-215.*

(Continued)

*Primary Examiner*—Nabil El-Hady
*Assistant Examiner*—Chad Zhong (57) ABSTRACT

In a wireless internet access system, an access point of a base station and a group of wireless modems communicate over a wireless channel. This wireless channel comprises a sequence of "dwells," where each dwell represents a period of time, e.g., 20 milli-seconds (ms). Each dwell can convey both uplink (or upstream) and downlink (or downstream) transmissions to, and from, the group of wireless modems. However, in each dwell a particular wireless modem can only communicate half-duplex—either provide an uplink transmission to the access point, or receive a downlink transmission from the access point. The access point load balances, or distributes, the downlink transmissions to the group of wireless modems across the dwells upon detection that some dwells convey more downlink transmissions than other dwells.

7 Claims, 6 Drawing Sheets

OTHER PUBLICATIONS

Introduction to Telecommunication Electronics second edition 1995. A. Michael ☐☐Noll, p300-301.*

"Dynamic Load balancing of Iterative Data Parallel Problems on a Workstation Clustering" 1997, Hye-Seon Maeng, Hyoun-Su Lee, Tack-Don Han, Sung-Bong Yang, and Shin-Dug Kim.*

"Flow control and dynamic load balancing in Time Warp" Apr. 16, 2000, Myongsu Choe. Tropper, C.*

"MMTP—Multimedia Multiplexing Transport Protocol" Luiz Magalhaes Spring 2000.*

"A cellular wireless local area network with QoS guarantees for heterogeneous traffic", Choi et al., 1997 ieee.*

S. Jamaloddin Golestani, "A Self-Clocked Fair Queueing Scheme for Broadband Applications", *Proceeding of IEEE Infocom*, 1994, pp. 5c1.1-5c1.11.

* cited by examiner

LOAD BALANCING TECHNIQUE FOR A WIRELESS INTERNET ACCESS SYSTEM

CROSS-REFERENCE TO RELATED APPLICATIONS

This application claims the benefit of U.S. Provisional Application No. 60/198,389, filed Apr. 19, 2000. Related subject matter is disclosed in the co-pending, commonly assigned, U.S. Patent application of Abraham et al., entitled "Guaranteeing Types of Service in a Packet-Based System," application Ser. No. 09/500,390, filed on Feb. 8, 2000.

FIELD OF THE INVENTION

This invention relates generally to communications and, more particularly, to packet communications systems.

BACKGROUND OF THE INVENTION

Access to the Internet is now occurring via the wireless domain. For example, it is now possible to purchase small hand-held devices such as the Palm VII™, which provide access to the Internet via a wireless connection to a service provider. Further, at least one equipment manufacturer is advertising a wireless Internet access system (i.e., the Wireless Internet Access System from Lucent Technologies Inc.). In such an environment equipment manufacturers and service providers are becoming concerned about "Quality-of-Service" (QoS) issues in providing such service to their customers. Some examples of QoS issues are guarantees on, e.g., bit rate, delay and packet loss.

SUMMARY OF THE INVENTION

One form of wireless internet access system utilizes a half-duplex communications link between a group of wireless modems and an access point of a base station (notwithstanding the fact that the access point is capable of full-duplex operation). We have observed that in such a wireless internet access system situations can occur causing low bandwidth utilization of the downlink channel of the half-duplex communications link—thus affecting QoS. Therefore, and in accordance with the principles of the invention, load balancing is performed on the downlink channel.

In an embodiment of the invention, an access point of a base station and a group of wireless modems communicate over a wireless channel. This wireless channel comprises a sequence of "dwells," where each dwell represents a period of time, e.g., 20 milli-seconds (ms). Each dwell can convey both uplink (or upstream) and downlink (or downstream) transmissions to, and from, the group of wireless modems. However, in each dwell a particular wireless modem can only communicate half-duplex—either provide an uplink transmission to the access point, or receive a downlink transmission from the access point. The access point load balances, or distributes, the downlink transmissions to the group of wireless modems across the dwells upon detection that some dwells convey more downlink transmissions than other dwells.

DETAILED DESCRIPTION

Figure 1:
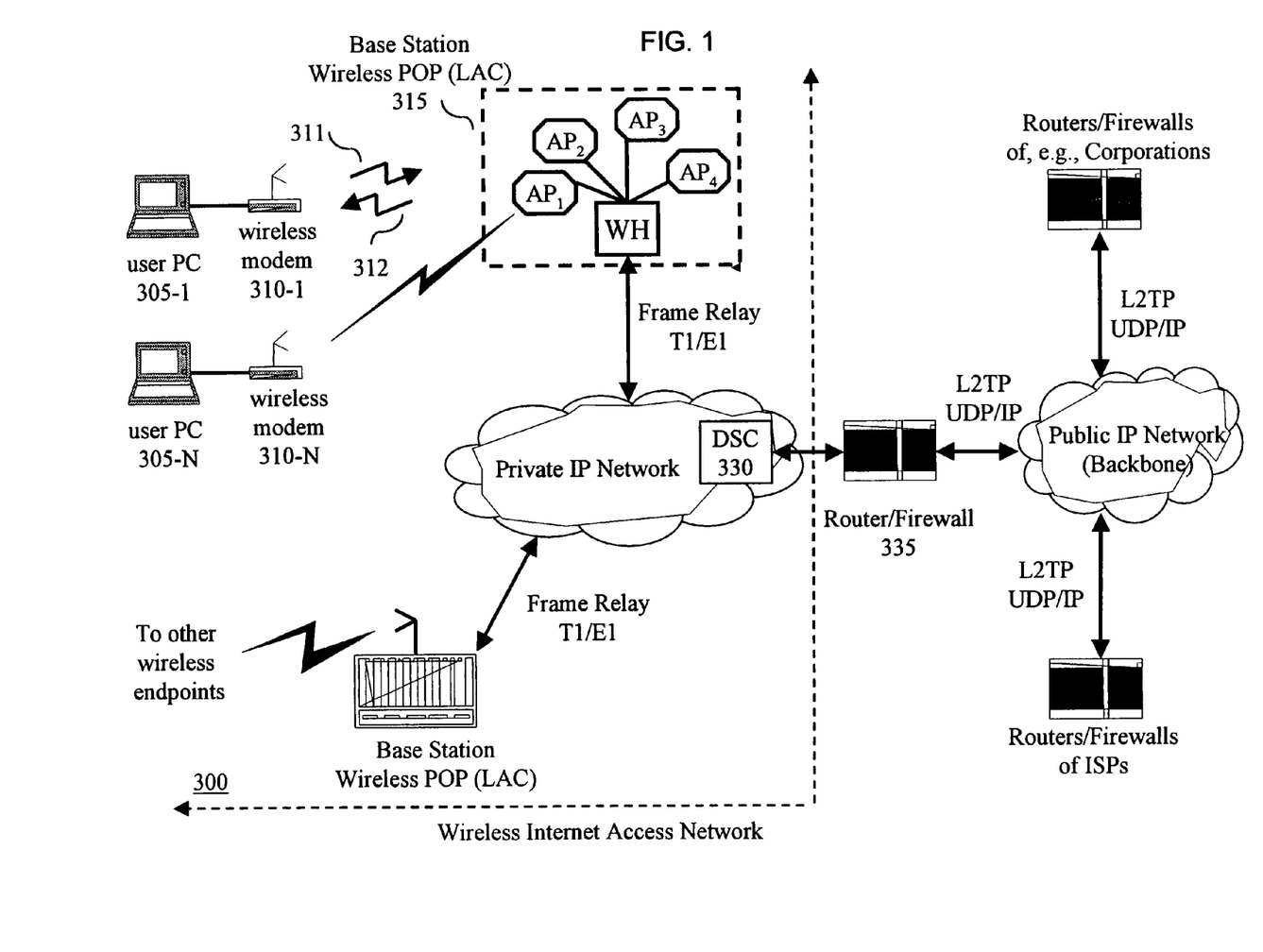
FIG. 1 shows a portion of a wireless internet access network embodying the principles of the invention.

A portion of an illustrative wireless internet access system embodying the inventive concept is shown in FIG. 1. (Other than the inventive concept, an example of a wireless internet access system as illustrated in FIG. 1 is the Wireless Internet Access System from Lucent Technologies Inc.) Portion 300 comprises a number of base stations such as base station 315, which is an example of a wireless point-of-presence (POP) server that provides L2TP (Layer 2 Tunneling Protocol) access control (LAC). Each base station comprises a wireless hub (WH) that serves an area through a plurality of access points (e.g., $AP_1$, $AP_2$, $AP_3$ and $AP_4$ of base station 315). Each access point includes a radio access controller as known in the art for communicating with a plurality of wireless modems as represented by wireless modems 310-1 through 310-N (each wireless modem is associated with a wireless subscriber as represented by user personal computer (PC) 305-1 through user PC 305-N). (It should be noted that each PC is representative of data terminal equipment (DTE) as known in the art.) Each wireless modem communicates with a respective base station via an uplink channel (as represented by line 311) and a downlink channel (as represented by line 312). A wireless modem and/or user PC represents a wireless endpoint, or device, which may, or may not, be mobile. Each base station is coupled to a private IP network through frame relay over T1/E1 facilities. The wireless internet access network is coupled to the public IP network through a data switching center (DSC) 330 to a router firewall 335, as known in the art, for communicating with Internet Service Providers (ISPs) or Corporate Intranets using L2TP, UDP/IP (User Datagram Protocol/Internet Protocol), etc.

It is assumed that the wireless internet access system illustrated by FIG. 1 utilizes a full-duplex MAC (media access control layer) between the base stations and the wireless endpoints. The MAC has a raw bandwidth of 1.2 Mbps (millions of bits per second). Every active wireless modem associates with one access point. While an access point is capable of operating in full duplex mode, the wireless modems operate in a half-duplex mode. As such, the maximum downlink bandwidth available for a wireless modem is half the available airlink bandwidth. In this system, each access point polls their associated wireless modems for uplink transmissions. For example, in the context of FIG. 1, $AP_1$ polls the set of wireless modems 310-1 through 310-N for any uplink transmissions (polling techniques are known in the art and not described herein).

Figure 2:
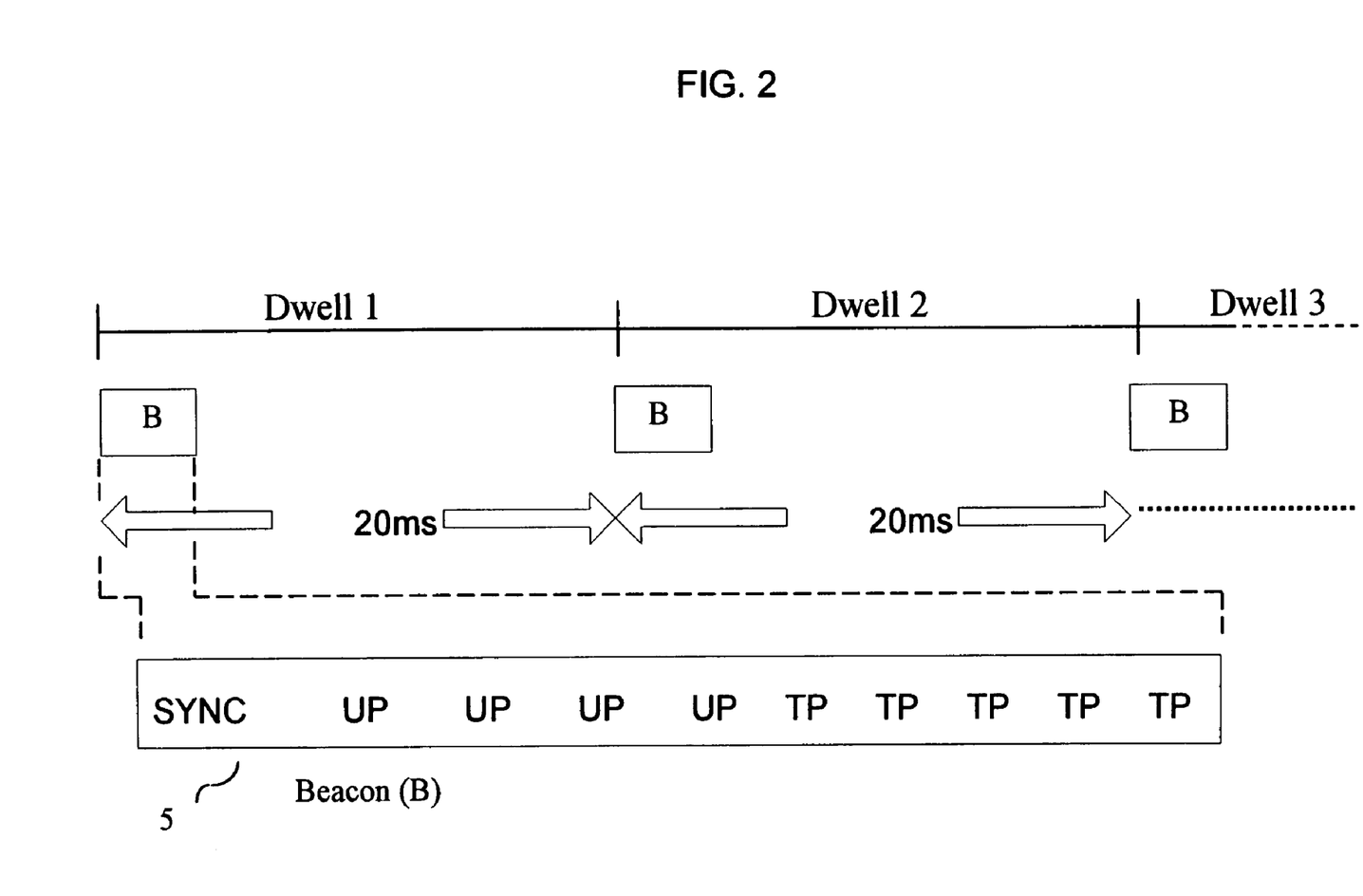
FIG. 2 illustrates a sequence of dwells.

Although shown as separate downlink and uplink channels (e.g., 311 and 312) for each wireless modem, communication between a group of wireless modems, e.g., 310-1 through 310-N, and an access point, e.g., $AP_1$, takes place in a sequence of dwells, or time slots, as illustrated in FIG. 2. The sequence of dwells can be further characterized as "odd dwells," e.g., dwells 1 and 3 of FIG. 2, and "even dwells," e.g., dwell 2 of FIG. 2. Each dwell lasts for 20 milli-seconds (ms). A beacon (B) cell initiates the start of every dwell and is broadcast by the access point. When an access point broadcasts a beacon, all wireless modems are in a receive mode. The beacon (e.g., see beacon 5 of FIG. 2) comprises a sync message (sync), uplink polls (UP) and transmit polls (TP). The sync message enables synchronization between a wireless modem and a corresponding access point. An uplink poll is used by the access point to specify to a particular wireless modem at what point in the dwell to start transmitting data to the access point and for how long the wireless modem can transmit. A transmit poll is used by the access point to specify to a particular wireless modem at what point in the dwell to start receiving data from the access point. Since transmission for each wireless modem is half duplex, each wireless modem can only transmit or receive in a particular dwell. However, as can be observed from FIG. 2, each dwell supports communications in either direction from a group of wireless modems—so while one wireless modem is receiving in a dwell, another wireless modem may be transmitting in the same dwell. In addition, each downlink transmission to a particular wireless modem in a particular dwell requires an uplink acknowledgement from that wireless modem in the next dwell. For example, if a packet is sent from $AP_1$ to wireless modem 310-1 in dwell 1 of FIG. 2, then $AP_1$ expects to receive an uplink acknowledgment from wireless modem 310-1 in dwell 2 of FIG. 2.

In order to support QoS (Quality of Service) differentiated services, each access point provides three priority classes of service. In each priority class, downlink traffic for a particular wireless modem is stored in a queue assigned to that wireless modem. The queues in a priority class are served by a round robin scheduler. The access point services queues in a strict priority sequence. The queues in a lower priority class are serviced only if no traffic from all higher priority classes can be sent either due to empty queues or due to the fact that the access point cannot schedule a transmit and receive in the same dwell.

Figure 3:
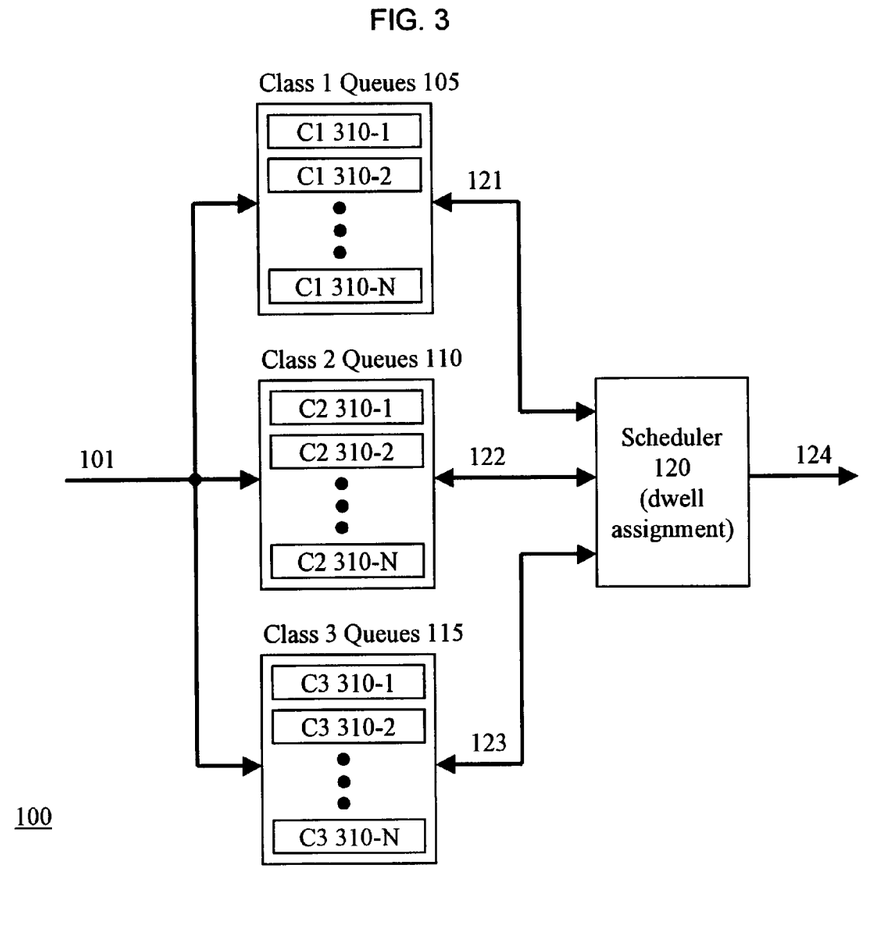
FIG. 3 shows an illustrative downlink scheduler in accordance with the principles of the invention.

An illustrative downlink scheduler 100 for use in an access point, e.g., $AP_1$, is shown in FIG. 3. Other than the inventive concept, the elements shown in FIG. 3 are well known and will not be described in detail. For example, queues and schedulers, by themselves, are known in the art (e.g., see "A Self-Clocked Fair Queueing Scheme for Broadband Applications," J. Golestani, Proceeding of IEEE Infocom 1994, pp 5c.1.1–5c 1.11). Although shown as single block elements, the elements of downlink scheduler 100 includes stored-program-control processors, memory, and appropriate interface cards (all not shown). In addition, the inventive concept is implemented using conventional programming techniques, which as such, will not be described herein. Since call admission techniques are not necessary to the inventive concept, it is assumed that each user negotiates with a call admission process (not shown) to establish a call with one of the above-mentioned classes of service for downstream traffic.

Downlink scheduler 100 comprises scheduler 120 and 3 sets of class queues: class 1 queues 105, class 2 queues 110 and class 3 queues 115. Class 1 is the highest priority class, while class 3 is the lowest priority class. (It should be noted that scheduler 120 may also include a packet shaper, i.e., perform other packet shaping functions as known in the art, which are not relevant to the inventive concept.) Each set of class queues includes individual queues for each wireless modem, e.g., class 1 queues 105 comprises individual queues C1 310-1 through C1 310-N, associated with wireless modems 310-1 through 310-N, respectively. Downstream packet traffic is applied to the respective class queue via line 101 (which is assumed to also represent a packet classifier (not shown) for directing each packet received by downlink scheduler 100 to the appropriate class queues for the respective modem). For every dwell, or scheduling interval, scheduler 120 performs downlink scheduling as follows. Scheduler 120 temporarily stores in a memory (not shown) the last individual queue that was served during the last dwell and begins with the individual queue next to it. For example, if the last individual queue served in the last dwell was C1 310-1 of class 1 queues 105, then scheduler 120 starts this scheduling interval with individual queue C1 310-2 of class 1 queues 105 (via line 121). Continuing with this example, before removing packets from individual queue C1 310-2, scheduler 120 checks if any packet(s) were sent during the previous dwell to wireless modem 310-2. (It is assumed that such transmission information is stored in a table (not shown).) If there was at least one packet transmitted to wireless modem 310-2 during the previous dwell, scheduler 120 does not operate on this queue since an uplink acknowledgment must be received from wireless modem 310-2 for the previously transmitted packet(s). Conversely, if no packet was sent to wireless modem 310-2, scheduler 120 tries to schedule all the packets (if any) from individual queue C1 310-2 for transmission to wireless modem 310-2 before moving to the next eligible queue. Scheduler 120 moves to class 2 queues 110 (via line 122) only after exhaustively serving all eligible individual queues of class 1 queues 105. Similarly, scheduler 120 only serves class 3 queues 115 (via line 123) after exhaustively serving all eligible queues in class 2 queues 105. After serving class 3 queues 115, scheduler 120 repeats the process (time permitting in the current scheduling interval). (Obviously, the dwell period, or scheduling interval, may expire before scheduler 120 completes servicing all of the class queues. Regardless, scheduler 120 simply picks up where it left off, as noted earlier.)

Figure 4:
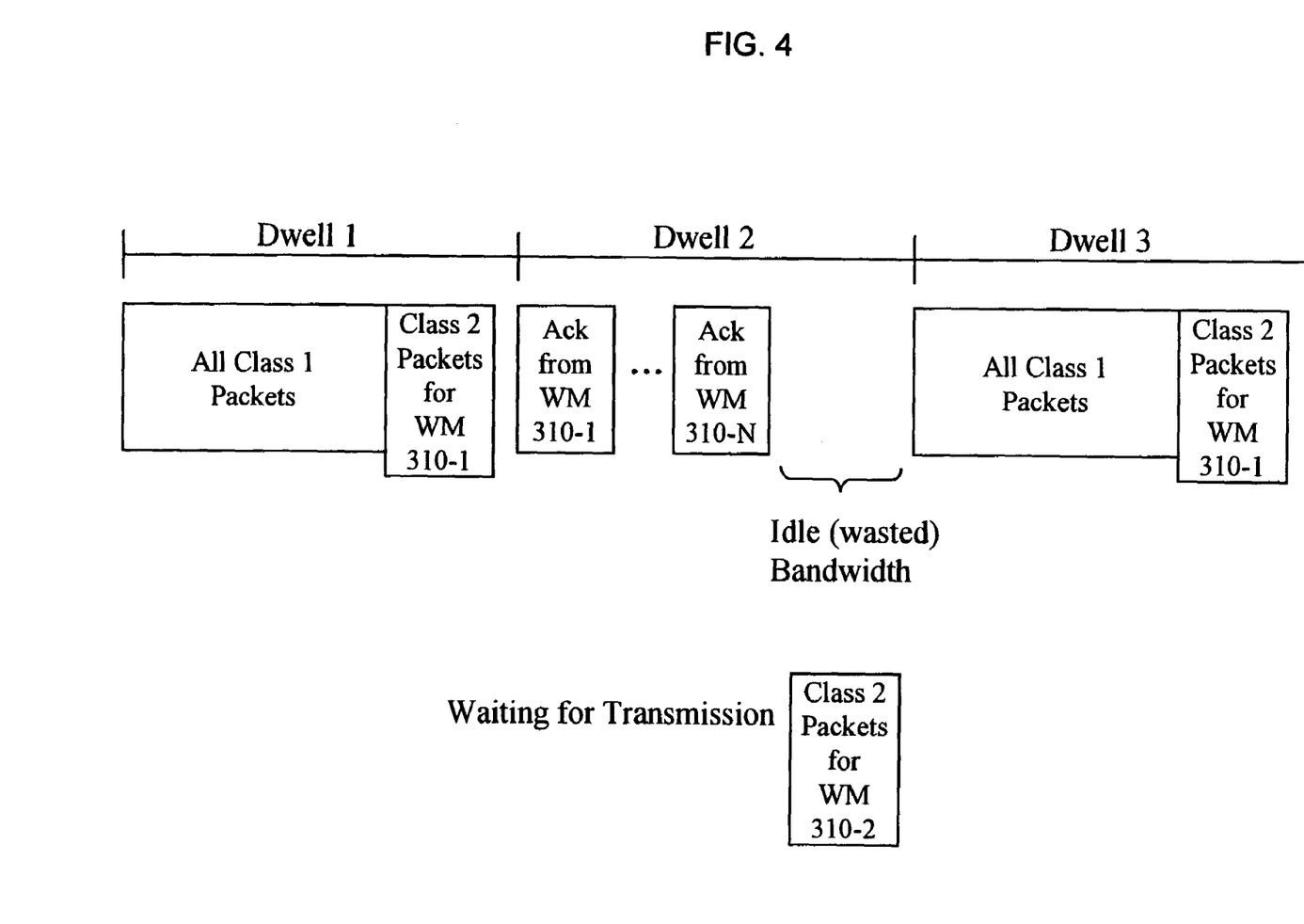
FIG. 4 conceptually illustrates load imbalance.

Absent the inventive concept, we have observed the following phenomena, which is conceptually illustrated in FIG. 4. First, the following assumptions are made. All wireless modems associated with $AP_1$ have similar traffic. In particular, class 1 sources are all synchronized and send one small packet to $AP_1$ every 40 ms (i.e. every 2 dwells) for each active wireless modem served by $AP_1$ (in this example assumed to be wireless modems 310-1 through 310-N). Further, all class 2 traffic is FTP (file transfer protocol) type with large packets. Finally, at the beginning of a dwell, e.g., dwell 1, assume that all the individual queues of class 1 queues 105 have a packet waiting (and that scheduler 105 starts the scheduling interval with individual queue C1 310-1). Assuming the class 1 packets are small enough, scheduler 120 sends all of the class 1 packets downlink to each of the wireless modems in dwell 1. In the remaining bandwidth of dwell 1, scheduler 120 serves as much class 2 traffic as possible, here represented by at least one class 2 packet destined for wireless modem 310-1. It should be noted that at least one packet was transmitted to each wireless modem in dwell 1. Hence, dwell 2 is only used for uplink acknowledgements and no downlink traffic is sent. As such, in dwell 2 bandwidth is idle, i.e., wasted. When dwell 3 starts, the same situation is repeated—downlink transmission in dwell 3, uplink acknowledgements in dwell 4 (not shown). If this situation continues, any bandwidth available in an even dwell for downlink traffic is wasted, and poor throughput for class 2 traffic is noted (since, as illustrated in FIG. 4, only wireless modem 310-1 is receiving any class 2 traffic and class 2 packets, e.g., for wireless modem 310-2, are still waiting for transmission). In other words, downlink transmissions may become locked into every other dwell (even or odd)—thus potentially wasting half of the downlink bandwidth (which was already half of the available airlink bandwidth due to the half duplex operation of the wireless modems).

Thus, we have observed that the combination of priority scheduling and the fact that a wireless modem cannot be scheduled to send and receive in the same dwell can lead to a situation where most of the wireless modems can only be sent downlink packets in, e.g., odd dwells (or, conversely, in even dwells). Therefore, and in accordance with the principles of the invention, load balancing is performed on the downlink channel by scheduler 120. In particular, a load balancing algorithm (described below) equalizes the load across dwells and thus improves bandwidth utilization.

Figure 5:
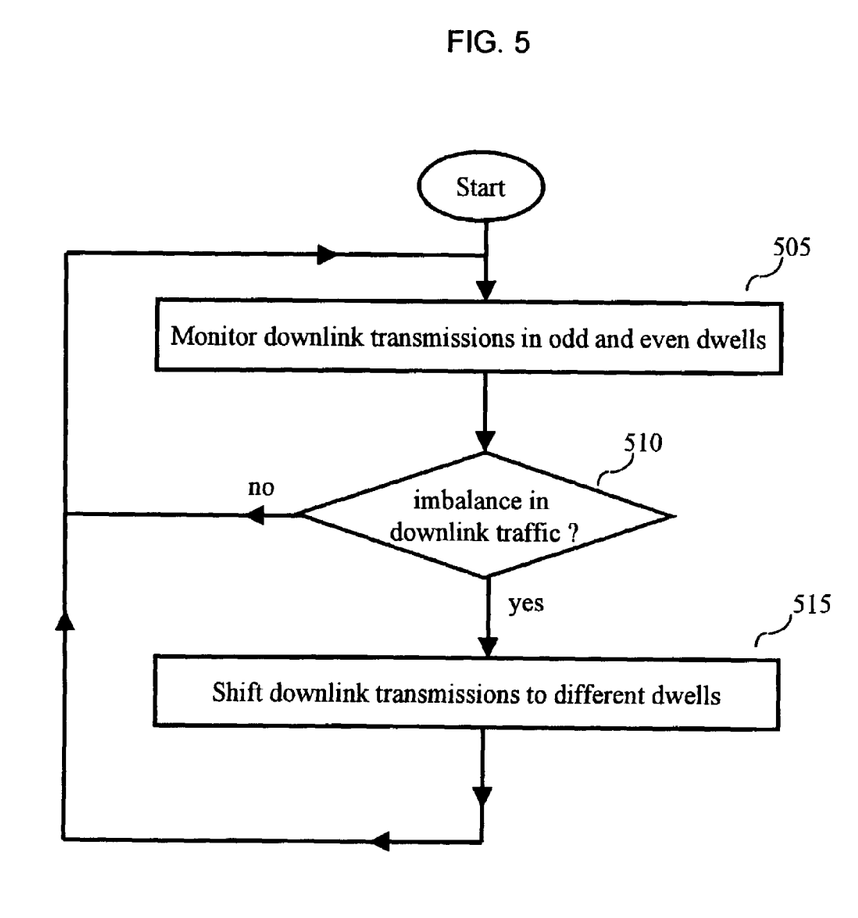
FIG. 5 shows a flowchart in accordance with the principles of the invention.

Turning to FIG. 5, an illustrative flow chart is shown embodying the principles of the invention. In step 505, scheduler 120 monitors traffic, i.e., downlink transmissions, sent in the odd and even dwells. In step 510, scheduler 120 checks if there is an imbalance in the downlink traffic as between the odd and even dwells. If no imbalance is detected, scheduler 120 returns to step 505. However, if an imbalance is detected, in step 515 scheduler 120 redistributes at least some of the downlink wireless modem traffic to different dwells in an attempt to equalize the downlink traffic assignments across dwells and returns to step 505.

An illustrative implementation for use in scheduler 120 for adjusting downlink traffic between odd and even dwells is presented below in pseudo-code form. The following variables and data structures are defined:

f—a variable, the value of which represents an imbalance measure between odd and even dwells;

f_e—a variable, the value of which represents an imbalance measure for even dwells;

f_o—a variable, the value of which represents an imbalance measure for odd dwells;

f_w[i]—a variable, the value of which represents an imbalance measure for each wireless modem, $WM_i$;

M—the number of dwells measured;

y1[i]—is the number of bytes sent in M odd dwells to wireless modem $WM_i$;

y2[i]—is the number of bytes sent in M even dwells to wireless modem $WM_i$;

x1—is the sum of all y1[i], i.e., x1=Σy1[i];

x2—is the sum of all y2[i], i.e., x2=Σy2[i];

a1—an intermediate parameter, calculated as shown below;

c—an intermediate parameter, calculated as shown below;

h—represents an averaging parameter, where h<1 and, illustratively, h= 0.8; and threshold—represents an illustrative threshold value for adjusting the dwells and illustratively, threshold=0.3.

An illustrative implementation of the method shown in FIG. 5 is as follows. First, perform the following initializations:

Initialize the imbalance measure f=0;

For each wireless modem, $WM_i$, set f_w[i]=0; and

Set M=5.

Then, scheduler 120 performs the following initial calculations:

Determine x1, by counting the total number of bytes sent over M odd dwells to all wireless modems (i.e., over all i for $WM_i$);

For each wireless modem, $WM_i$, i=1, . . . , N, determine y1[i] by counting the number of bytes sent over M odd dwells to each wireless modem;

Determine x2, by counting the total number of bytes sent over M even dwells to all wireless modems (i.e., over all i for $WM_i$); and For each wireless modem, $WM_i$, i=1, . . . , N, determine y2[i] by counting the number of bytes sent over M even dwells to each wireless modem.

Every 2M dwells scheduler 120 performs the following calculations:

$$f\_e=(1-h)*f\_e+h*[(x2)/(x1+x2)];$$

$$f\_o=(1-h)*f\_o+h*[(x1)/(x1+x2)];$$

$$f=f\_o-fe;$$

for each $WM_i$ (for i=1, . . . , N) do the following:

```
-f_w[i] = (1 - h)*f_w[i] + h*[(y1[i] - y2[i])/(x1 + x2)];
-If(abs(f) > Threshold)
    {a1 = 0;
    c = abs(f)/2;
    If(f > 0)
        {Sort the WMs in increasing order of f_w[i]//Reindex WMs;
        for i = 1, . . . , N
            {if(f_w[i] > 0)
                {if(f_w[i] + a1 < c)
                    {Move WM_i to even dwells;          (1)
                    a1 = a1 + f_w[i];
                    }
                }
            }
        }
    else
        {Sort the WMs in increasing order of - f_w[i]//Reindex WMs;
        for i = 1, . . . , N
            {if(f_w[i] < 0)
                {if(-f_w[i] + a1 < c)
                    {Move WM_i to odd dwells;            (2)
                    a1 = a1 - f_w[i];
                    }
                }
            }
        }
    f_e = 0; f_o = 0; f_w[i] = 0 for i = 1, . . . , N
    }
```

As a result of the above, should scheduler 120 detect a load imbalance across even and odd dwells, scheduler 120 shifts the traffic for particular wireless modems to the other type of dwell (e.g., see steps (1) and (2), above), thus reducing the imbalance.

Figure 6:
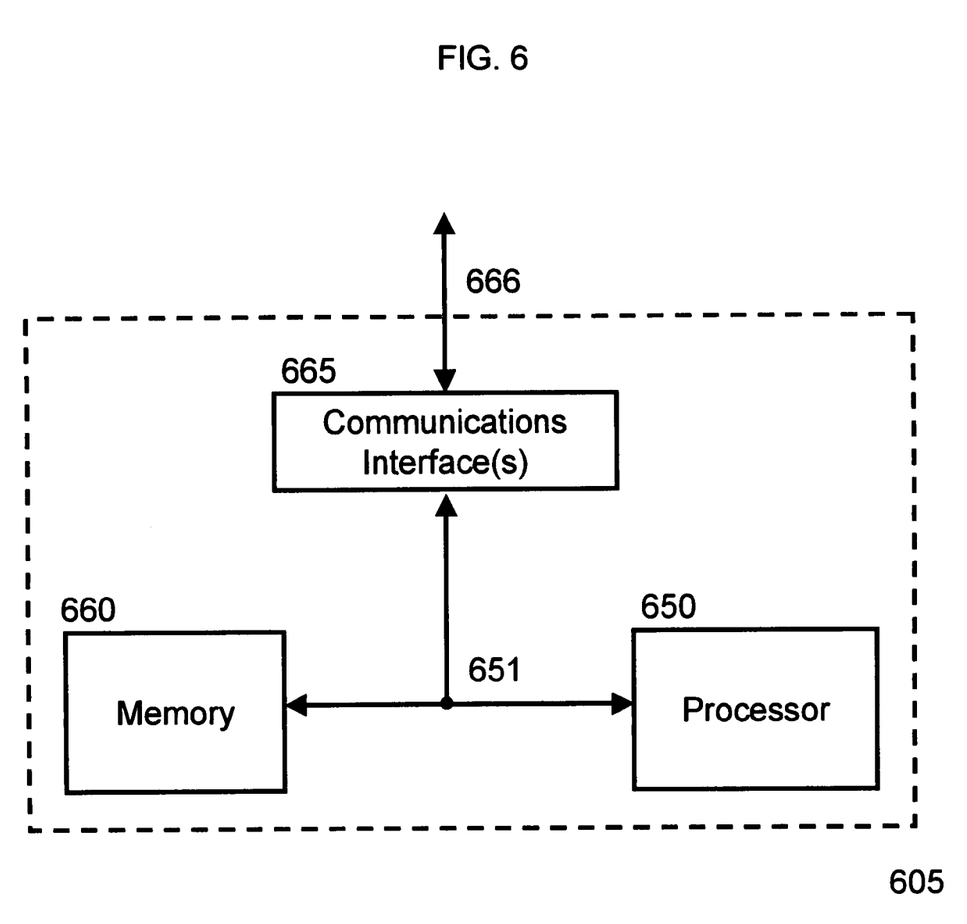
FIG. 6 shows an illustrative high-level block diagram of an access point comprising a downlink scheduler.

Turning briefly to FIG. 6, a high-level block diagram of a representative access point comprising a downlink scheduler for use in accordance with the principles of the invention is shown. Access point 605 is a stored-program-control based processor architecture and includes processor 650, memory 660 (for storing program instructions and data, e.g., for performing the above-described method shown in FIG. 5, etc.) and communications interface(s) 665 for coupling to one or more packet communication paths as represented by path 666 (e.g., 665 represents a transmitter and a receiver).

(It should be noted that the downlink scheduler described above could alternatively be implemented at other points of portion 300 of FIG. 1. For example, the downlink scheduler could be a part of the wireless hub (WH) provided the WH has access to dwell assignment information for downstream packets along with suitable modifications to support a plurality of access points.)

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of a wireless system, the inventive concept is applicable to any system (e.g., wired, etc.) that addresses QoS.

What is claimed:

1. A method for use in a transmitter, the method comprising the steps of:
   using a downlink channel from the transmitter to convey information to a group of endpoint devices; and
   load balancing the downlink channel; wherein the downlink channel comprises a sequence of dwells, each dwell having a time period, and wherein the method further comprises the step of detecting that at least one dwell of the sequence conveys more downlink information than the other dwells of the sequence as a prerequisite to performing the load balancing step.

2. A method for use in a wireless system, the method comprising the steps of:
   sending data from a transmitter to a group of N wireless endpoints over a downlink communications channel comprising a sequence of time slots;
   detecting an imbalance such that some of the time slots convey more data than other time slots; and
   shifting some of the data from at least one time slot to another time slot for reducing the detected imbalance.

3. The method of claim 2 wherein the detecting step includes the steps of:
   measuring the amount of data sent in each of M timeslots to the N wireless endpoints; and
   comparing the measured data for at-least-one of the M timeslots to others of the M timeslots for detecting the imbalance.

4. A method for use in a wireless system, the method comprising the steps of:
   sending data to a group of N wireless endpoints from a source over a downlink communications channel comprising a sequence of time slots;
   detecting an imbalance such that every other time slot of the sequence conveys more data than the remaining time slots of the sequence; and
   shifting some of the data from at least one of the every other time slots to at least one of the remaining time slots for reducing the detected imbalance.

5. Apparatus for use in a communications system, the apparatus comprising:
   a transmitter for providing a downlink channel to convey information to a group of endpoint devices; and
   a processor for performing load balancing on the downlink channel;
   wherein the downlink channel comprises a number of dwells, each dwell having a time period, and wherein the processor performs the load balancing upon detection that at least one of the dwells conveys more downlink information than the other dwells.

6. Apparatus for use in a wireless system, the apparatus comprising:
   a memory for storing data for transmission from a source to a group of N wireless endpoints via a downlink channel;
   a scheduler for retrieving the stored data and for measuring the amount of stored data transmitted in each of M timeslots in the downlink channel to the N wireless endpoints, and for comparing the measured data for at-least-one of the M timeslots to others of the M timeslots for detecting an imbalance in the transmission and for shifting some of the data from at least one time slot to another time slot for reducing the detected imbalance.

7. Apparatus for use in a wireless system, the apparatus comprising:
   a memory for storing data for transmission to a group of N wireless endpoints;
   a scheduler for retrieving the stored data and for measuring the amount of stored data transmitted in each of M timeslots to the N wireless endpoints, and for detecting an imbalance such that every other time slot of the M time slots convey more data than the remaining time slots of the M time slots; and for shifting some of the data from at least one of the every other time slots to at least one of the remaining time slots for reducing the detected imbalance.

* * * * *